Feb. 17, 1953 E. L. RABBEN 2,628,530
OPHTHALMIC LENS DEVICE IN WELDER'S HOOD
Filed Aug. 3, 1949
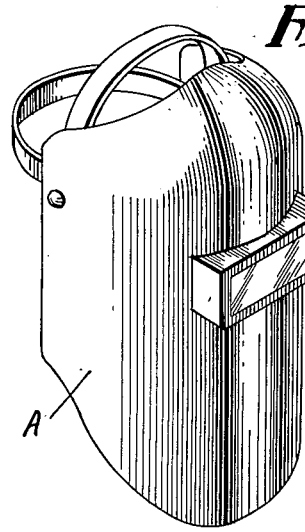
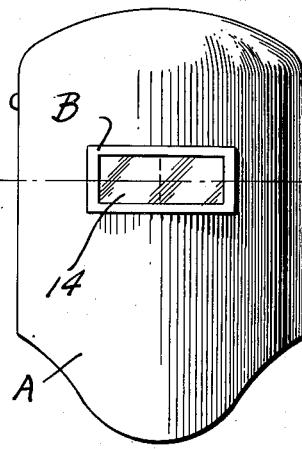
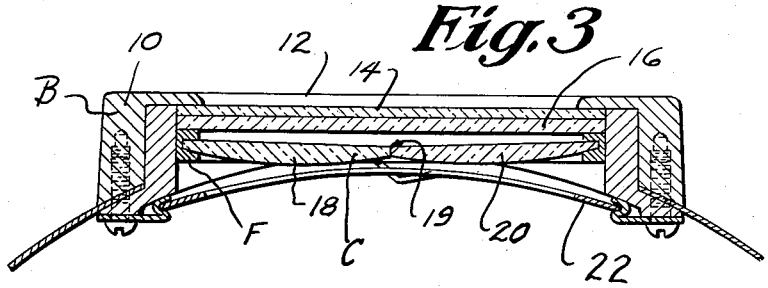
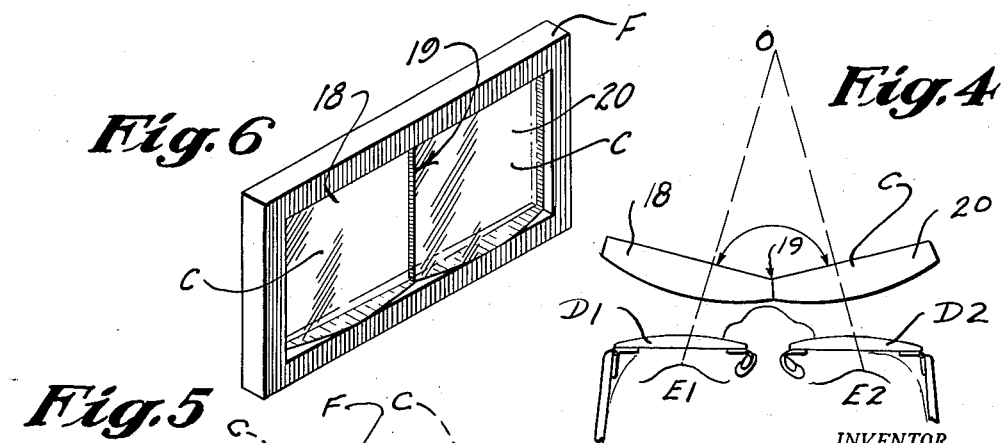
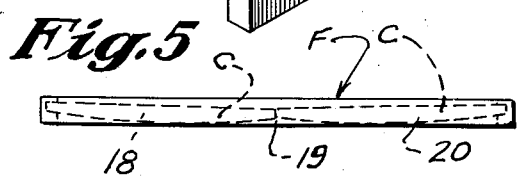
INVENTOR.
Ellis L. Rabben
BY Harry Langsam
Attorney Patented Feb. 17, 1953

2,628,530

UNITED STATES PATENT OFFICE 2,628,530

OPHTHALMIC LENS DEVICE IN WELDER'S HOOD

Ellis L. Rabben, Norfolk, Va.

Application August 3, 1949, Serial No. 108,337

1 Claim. (Cl. 88—41)

My invention relates to an ophthalmic lens and relates specifically to an ophthalmic lens involving a welder's hood and which enables ametropic or presbyopic welders to see the work clearly at working distances.

Heretofore, welding hoods have incorporated a sight window containing a removable cover glass and one or more filter glasses to exclude flying particles and harmful rays. However, it always come about that welders who reach the age when they require bifocals and who utilize such bifocals, or occupational modifications thereof, suffer from eye strain and other physical discomforts even if they wear such spectacles under the hood because their eyes tire easily at near and because the work is out of the range and field of vision covered by the bifocals. As a result of eye fatigue and blurred vision due to restricted or short range and restricted field of vision the bifocal-wearing welders have produced shabby work despite the fact that they possess the skill and the stamina to do excellent work. If the men who require bifocals utilize only near-sight or close-view spectacles or special types of occupational bifocals or trifocoals then a danger arises that when these men remove their hoods to move away from their work they may step into a manhole or other openings, they also may bump into objects to cause damage to themselves or to the objects and they find it extremely difficult and dangerous to move about without also removing the spectacles, at which time they may still be in the same dangerous situation for want of any lenses at all. Under such conditions it has been difficult for the older welders to perform all their duties satisfactorily. Many men who must wear bifocals and who would otherwise be capable welders have been removed from the duties they are best fitted for because of inadequate equipment to cope with the problem.

Heretofore, there have been no supplemental devices contained in welder's hoods which enable welders who find it necessary to wear bifocals, to satisfactorily correct their eyesight, to perform their duties satisfactorily as welders by eliminating their inability to properly see close-up objects below them, on line with the eyes, and also overhead, and at the same time to enable them to prevent injury to themselves, to their fellow workmen, and to property at the time they perform their duties and after they have completed their duties during the working period of time.

It, therefore, is an object of my invention to provide a specially modified correction lens to fit in a welding hood whereby a welder who finds it necessary to wear bifocals can perform all of his duties when wearing his bifocals, or when wearing only distance vision spectacles.

Another object of my invention is to provide an auxiliary optical device in a welder's hood whereby maximum availability of an unbroken and wide field of vision is brought about.

Another object of my invention is to provide an auxiliary ophthalmic lens to be inserted in a welder's hood and which can be removed at will, and which will provide correction for a presbyopic person.

Another object of my invention is to provide an auxiliary ophthalmic lens for a welder's hood which will enable a presbyopic welder to clearly see closely-held work, such as is encountered in the usual types of welding, at any elevation or depression or in any sidewise direction or combinations thereof.

Another object of my invention is to provide an auxiliary unitary pair of ophthalmic lenses wherein the general outline of each of the pair of lenses is rectangular with the center ground edge of each lens adjoining the center ground edge of the other lens whereby a maximum utilization of the vision area is maintained.

Another object of my invention is to provide an auxiliary unitary pair of ophthalmic lenses as an occupational aid wherein a maximum utilization of the vision area is maintained.

Another object of my invention is to provide an auxiliary unitary pair of ophthalmic lenses as an occupational aid wherein a maximum utilization of the vision area is maintained for a person wearing ophthalmic lenses in spectacles and a welder's hood.

Other objects of my invention are to provide an improved device of the character described, that is easily and economically produced, which is sturdy in construction and which is highly efficient in operation.

With the above and related objects in view, my invention consists in the details of construction and combination of parts, as will be more fully understood from the following description, when read in conjunction with the accompanying drawing in which:

Fig. 1 is a perspective view of a welder's hood embodying my invention.

Fig. 2 is a front view of the hood.

Fig. 3 is a sectional view taken along the line 3—3 of Fig. 2.

Fig. 4 is a schematic view showing the general essence of my invention.

Fig. 5 is a top view of the auxiliary lens and frame holder.

Fig. 6 is a perspective view of the auxiliary occupational lenses and its complementary frame showing a marking on the side thereof.

Referring now in detail to the drawing wherein similar reference characters refer to similar parts I show in Figs. 1 and 2 a welder's hood, generally designated as A, wherein my invention is contained. Suitably mounted and customarily upon the hood A is a rectangular shaped lens holding unit, generally designated as B.

The lens holding unit B comprises a lens supporting unit 10 with an opening 12 therein. The unit 10 carries a cover glass 14, a color or filter glass 16, and a unitary pair of occupational ophthalmic lenses, in a specially devised frame, generally designated as F.

The unitary occupational lenses 18 and 20 are in abutting relationship at 19, and they are held within the frame F. Each occupational lens 18 and 20 is adapted to be positioned before the prescription lenses D1 and D2 of the welder, with the welder's eyes being designated as E1 and E2. In a welder's hood the welder's eyes E1 and E2 are usually approximately 2½ inches from the occupational lenses 18 and 20.

A spring retainer ring 22 holds the frame F within the helmet lens retainer B.

The occupational lens fits into the welder's hood A of any standard type used for arc welding, and is placed behind the cover glass and filter glass, being nearest the filter glass and farthest from the front cover glass.

Each lens 18, 20 of a unitary pair of lenses in the frame F is of a matched focal length (same focal length), but the frame and lens combinations are made in numerous and various different focal lengths, convex, or concave, or cylindrical or in combination.

The focal length of the lenses 18, 20 is such that the power at the customary spectacle position D1, D2 is of such amount as is needed for the particular work distance and the particular user; that is, effectivity of lenses is taken into account in the event that a professional eye examiner should require that a particular power lens be used by the welder patient.

Each lens set is marked, on the frame or on one or both of the lenses, with a code number or letter or both indicating at which distance or for what age or both, that particular lens set will most likely give the best results as regards sharpness and clarity of the working field and relief from eyestrain.

The distance between the optical centers of the parts of the lens, hereinafter called the MPD, and therefore the location of the optical center in each part is based on a distance the same as or slightly less than the average anatomical pupillary distance, hereinafter termed APD, found in humans. This is in order to ensure that, in case induced prismatic effect caused by a difference between the MPD and the APD is encountered, such prismatic effect will be base in and therefore relieving in nature.

With the starting point of the average anatomical pupillary distance, the MPD varies as a function of the focal length of the lenses. The MPD is less when the focal length of the lenses is shorter, and is greater as the focal length increases. The ratio is direct. This is so because as the eyes gaze through the lenses at the particular working distance for which the lenses are designed the eyes will converge or diverge, as indicated by the focal length and thus the working distance, so that the lines of sight of the eyes will be approximately through the optical centers of the lens as an automatic matter.

It is also desirable that the plane of the lens surface be perpendicular to the line of sight of each eye, in order to reduce to a minimum the aberrations caused by looking through a lens at an angle.

The lenses 18, 20 therefore should not be on a straight line in relation to each other, that is flat in the frame F, but should be so held in the frame that they are at a slight angle to each other, see Fig. 4, so that the medial edge of each part is closer to the eyes than the distal edge.

The angle of the lenses to each other is also a function of the focal length of each lens. As the eyes converge or diverge according to the working distance, as indicated by the focal length of the lens in the combination, the perpendicular to the line of sight also turns. The ratio therefore, is direct. As the focal length is shorter and the visual axes are more convergent, the medial edge of each half of the lens in the frame is closer to the eyes by an amount related to the amount of convergence and therefore, the focal length.

For the purpose of determining the proper angles of lens parts in the frames, the same average anatomical pupillary distance is used as is used in determining the locations of the optical centers.

The lenses and parts used will almost always be of the convex type, although individual prescriptions, concave lenses, cylindrical lenses, and combinations of these also can be made. When the lenses are convex the plano-convex form is preferred, although they may also be bi-convex, concavo-convex, etc. Although it may be otherwise, it is preferable that the plano side of the plano-convex lens face the work, through the filter and cover glasses, and that the convex side face the eyes of the user.

The frame F encloses the edges of each lens part on three sides and holds the two parts together as hereinbefore described. The frame F is generally U-shaped in cross section, is rectangular, and of a size to fit in the vision slit of any standard arc welder's hood, and is preferably flat, although it can also be bent at its middle to give the parts the proper angle.

When the frame is flat, a channel is stamped, molded, or otherwise formed to hold the parts at the proper angle as before described. This channel or groove has a direction determined by the necessary lens characteristics, and varies from a straight line to as obtuse an angle at the middle of the frame as may be required.

With this device, the welder can make use of the lens power that he needs at any elevation or direction by merely moving his eyes; his only limits of clear near vision are those imposed by the vision slit of the hood, nor are there any blanks in his near field caused by the device. The awkward positions necessitated by bifocal lenses are thus avoided.

This device enables a welder to work more safely for, as soon as the hood is lifted, the lenses are immediately out of the way and cannot blur distance vision by their presence or absence, as happens with lenses (single vision) that are mounted in a conventional spectacle frame and that are focused for near work.

This device is an occupational aid and is independent of whatever prescription glasses the the welder otherwise needs. This device can be changed to suit the requirements of the particular work in hand and the change is accomplished quickly and easily.

The devise resists fogging by virtue of its placement when in use.

Although my invention has been described in considerable detail, such description is intended as being illustrative rather than limiting, since the invention may be variously embodied, and the scope of the invention is to be determined as claimed.

I claim as my invention:

In a welder's helmet having a vision aperture with cover and filter glasses, a visual aid located in the aperture behind the cover and filter glasses, said visual aid comprising a flat, rectangular frame channeled on its inner edges, a pair of rectangular ophthalmic corrective lenses fitting within the channeled frame, with the innermost edges of the lenses abutting one another in a vertical central line, said lenses being angled to each other and to the frame with the abutting edges closer to the eyes than the distal edges such that the lenses are approximately perpendicular to the lines of sight drawn on the object, the angling and power of the corrective lenses being selected to give clear vision at the desired object distance in conjunction with the spectacle power which the user requires for normal vision.

ELLIS L. RABBEN.

REFERENCES CITED

The following references are of record in the file of this patent:

UNITED STATES PATENTS

| Number | Name | Date |
|---|---|---|
| Re. 6,557 | Quirolo | July 27, 1875 |
| D. 137,337 | Gainsborg et al. | Feb. 22, 1944 |
| 701,788 | Berger | June 3, 1902 |
| 1,033,965 | Troppman | July 30, 1912 |
| 2,263,116 | Andrews | Nov. 18, 1941 |
| 2,270,238 | Clarke et al. | Jan. 20, 1942 |
| 2,333,362 | Clement | Nov. 2, 1943 |
| 2,388,574 | Ring | Nov. 6, 1945 |
| 2,391,361 | Stevenson | Dec. 18, 1945 |

FOREIGN PATENTS

| Number | Country | Date |
|---|---|---|
| 234,610 | Germany | May 16, 1911 |